(12) United States Patent
Kim

(10) Patent No.: US 11,730,581 B2
(45) Date of Patent: Aug. 22, 2023

(54) APPARATUS FOR VERIFYING CLEARANCE FOR DENTAL RESTORATIONS

(71) Applicant: DIRECTA AB, Upplands Vasby (SE)

(72) Inventor: Daniel Sung-Yul Kim, Vancouter, WA (US)

(73) Assignee: DIRECTA AB, Upplands Vasby (SE)

( * ) Notice: Subject to any disclaimer, the term of this patent is extended or adjusted under 35 U.S.C. 154(b) by 346 days.

(21) Appl. No.: 16/994,969

(22) Filed: Aug. 17, 2020

(65) Prior Publication Data
US 2020/0375713 A1 Dec. 3, 2020

Related U.S. Application Data

(63) Continuation of application No. 15/983,865, filed on May 18, 2018, now abandoned.

(60) Provisional application No. 62/508,334, filed on May 18, 2017.

(51) Int. Cl.
*A61C 19/05* (2006.01)
*A61C 3/00* (2006.01)
*A61C 5/77* (2017.01)

(52) U.S. Cl.
CPC ............ *A61C 19/05* (2013.01); *A61C 3/00* (2013.01); *A61C 5/77* (2017.02)

(58) Field of Classification Search
CPC ......... A61C 19/05; A61C 19/04; A61C 19/00; A61C 5/77; A61C 5/60; A61C 5/00; A61C 8/00
USPC ...................................... 433/68, 141
See application file for complete search history.

(56) References Cited

U.S. PATENT DOCUMENTS

| 6,382,974 B1 * | 5/2002 | Garfinkel | A61C 3/00 |
| | | | 433/144 |
| 2004/0038176 A1 * | 2/2004 | Hallows | A61C 3/00 |
| | | | 433/141 |

* cited by examiner

*Primary Examiner* — Ralph A Lewis
*Assistant Examiner* — Mirayda A Aponte
(74) *Attorney, Agent, or Firm* — Ryan Kromholz & Manion, S.C.

(57) ABSTRACT

A dental apparatus includes a center gripping portion defining a central axis, a mesial portion and a distal portion. The mesial portion includes an open-oriented constant diameter tip, the first leg projecting at an obtuse angle and the second leg projecting orthogonally from the first leg toward the central axis. The distal portion includes a closed-oriented constant diameter tip, the first leg projecting at an obtuse angle parallel to the mesial tip first leg and the second leg projecting orthogonally from the distal tip first leg and away from the central axis parallel to the mesial tip second leg.

7 Claims, 7 Drawing Sheets

APPARATUS FOR VERIFYING CLEARANCE FOR DENTAL RESTORATIONS

CROSS-REFERENCE TO RELATED APPLICATIONS

This application is a continuation of and claims benefit of U.S. patent application Ser. No. 15/983,865, which is a nonprovisional of, and claims priority to, U.S. Provisional Application Ser. No. 62/508,334 filed May 18, 2017.

FIELD OF THE INVENTION

The present invention relates to dental tools. More particularly, the present invention relates to dental tools for use in dental restoration procedures.

BACKGROUND

Dental restoration work, such as providing crowns, requires the dental surgeon to prepare the tooth or teeth to receive the crown or restoration, as well as the adjacent teeth, to ensure adequate post-restoration clearance for the crown. Clearance requirements vary depending on the type of restoration, material, and the patient. For example, for solid zirconia crowns, 1.0 mm clearance is generally required. For PFM and other bi-layered crowns, 1.5 mm clearance is generally required. For porcelain/ceramic crowns, 2.0 mm clearance is generally required.

An impression is then taken of the region to be sent to a lab/fabrication facility, generally off-site, to fabricate the permanent crown. This process requires the dental surgeon to essentially guess whether he or she has provided sufficient occlusal clearance, either by jury-rigging some sort of clearance measurement device, or by visual estimation.

Often times the dental surgeon's estimation is incorrect, but this only becomes apparent when the lab/fabrication facility attempts to make the restoration. Lab technicians' reports indicate that as much as 80% of the cases they receive have inappropriate reductions.

At that point, the dental surgeon has limited options to correct this problem: (1) reducing the opposing tooth at the lab; (2) reducing the abutment tooth at the lab; (3) providing metal occlusion; or, (4) performing another preparation and taking a new impression by the dental surgeon (which requires the patient to make another visit, and costs additional time and materials).

Thus, there is a need for an apparatus to guide and confirm the occlusal clearance mechanically to create ideal abutments every time for every patient. This avoids guesswork and further waste of costly chair time.

The inventor has created an apparatus, which may be used individually or provided as a system of a plurality of apparatus having selected precise clearances, and having tips for both mesial and distal arrangements to prepare crowns and onlays. The precisely-measured tips have unique shapes to glide along the cuspal waves of the occlusal surface and confirm the occlusal clearance. It also preserves the dental structure by preventing unnecessary reduction of the abutment tooth and helps provide crowns that are significantly less likely to fracture prematurely.

Additional advantages of the invention will be set forth in part in the description which follows, and in part will be obvious from the description, or may be learned by practice of the invention. The advantages of the invention may be realized and attained by means of the instrumentalities and combinations particularly pointed out in the appended claims. Further benefits and advantages of the embodiments of the invention will become apparent from consideration of the following detailed description given with reference to the accompanying drawings, which specify and show preferred embodiments of the present invention.

SUMMARY AND ADVANTAGES

An apparatus for verifying clearances for dental restorations includes a center gripping portion extending from a first end to a second end, a mesial portion extending from the first end, and a distal portion extending from the second end. The center gripping portion defines the central axis of the apparatus. The mesial portion includes an open-oriented constant diameter tip, having a selected constant diameter wire extending from a tapered transition region. Mesial tip first leg projects at an obtuse angle in relation to the central axis from the first tapered transition region and second leg projects orthogonally from the first leg back toward the central axis, thereby defining an open right-angle bend to ensure proper alignment in the mesial half of the occlusal clearance. The distal portion includes a closed-oriented constant diameter tip, having a selected constant diameter wire, extending from the second tapered transition region. Distal tip first leg projects at an obtuse angle in relation to the central axis from tapered transition region but parallel to the mesial tip first leg. Distal tip second leg projects orthogonally from the distal tip first leg and away from the central axis but parallel to the mesial tip second leg, thereby defining a closed right-angle bend to ensure proper alignment in the distal half of the occlusal clearance.

In an embodiment, the obtuse angle is approximately 115 degrees, which provides good orientation for the user to insert comfortably into the rear teeth of a patient and adequate visibility for the user. In an embodiment, the mesial and distal tip second legs are not more than 5 mm (0.2 inches). The mesial and distal constant diameter tips are circular in cross section to ensure precise measurement and patient comfort, but could be elliptical as well, or some variation of those.

The selected constant diameter wire is selected in the range 1.0 mm to 2.5 mm, and a kit may include a plurality of apparatus having different diameters over this range.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

REFERENCE NUMBERS USED IN THE DRAWINGS

Figure 1:
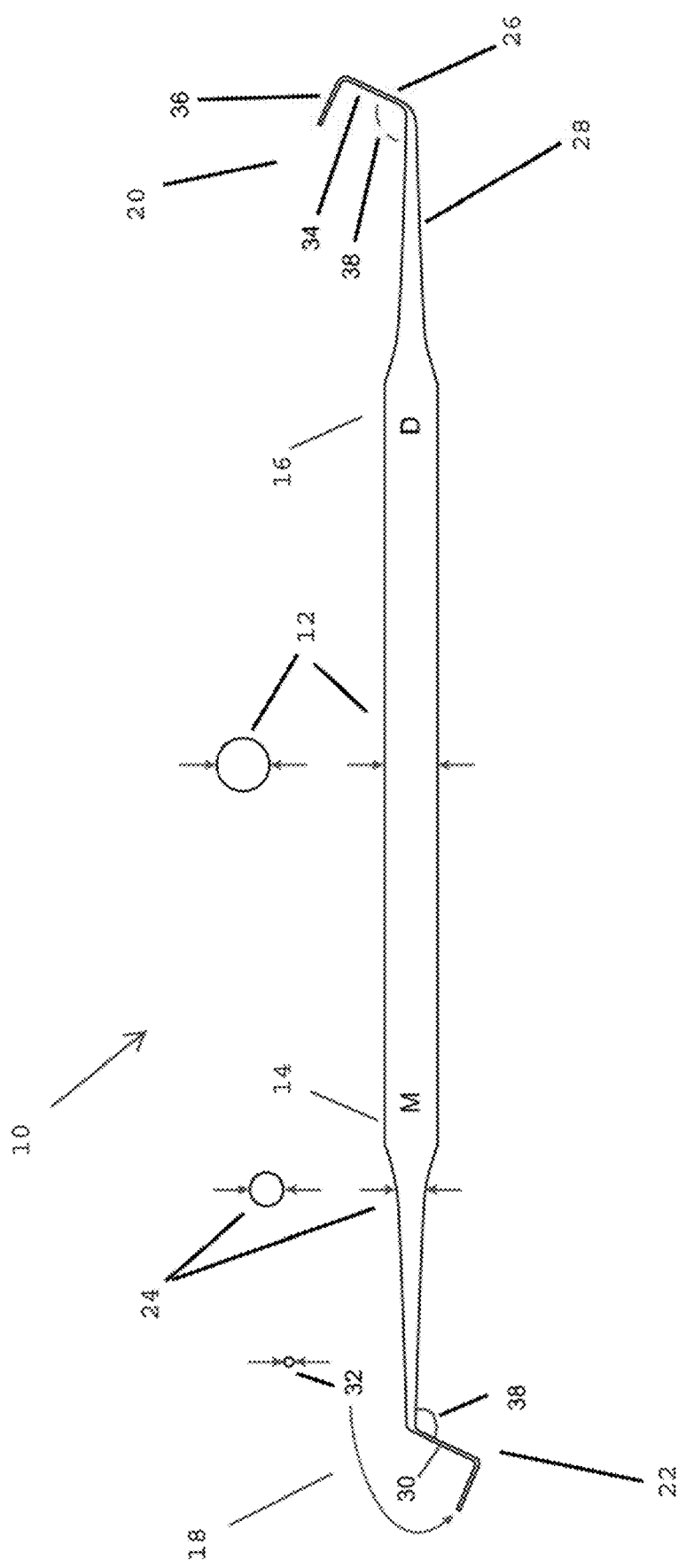
FIG. 1 shows a first embodiment of a 1.0 mm clearance tool.

Turning now descriptively to the drawings, in which similar reference characters denote similar elements throughout the several views, the figures illustrate the present invention. With regard to the reference numerals used, the following numbering is used throughout the various drawing figures:

10 First Embodiment
12 Center Gripping Portion
14 Center Portion First End
16 Center Portion Second End
18 Mesial Portion
20 Distal Portion
22 Mesial Tip
24 First Tapered Region
26 Distal Tip
28 Second Tapered Region
30 Mesial Tip First Leg
32 Mesial Tip Second Leg
34 Distal Tip First Leg
36 Distal Tip Second Leg
38 Obtuse Angle
100 Second Embodiment
200 Third Embodiment
300 Fourth Embodiment

DETAILED DESCRIPTION

Before beginning a detailed description of the subject invention, mention of the following is in order. When appropriate, like reference materials and characters are used to designate identical, corresponding, or similar components in differing figure drawings. The figure drawings associated with this disclosure typically are not drawn with dimensional accuracy to scale, i.e., such drawings have been drafted with a focus on clarity of viewing and understanding rather than dimensional accuracy.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Referring to FIGS. 1-7, apparatus for verifying clearances for dental restorations are shown.

Referring to FIG. 1, a first embodiment is shown, having a 1.0 mm tip diameter. An apparatus 10 includes a center gripping portion 12 extending from a first end 14 to a second end 16, a mesial portion 18 extending from the first end 14, and a distal portion 20 extending from the second end 16. The center gripping portion 12 defines the central axis of the apparatus 10.

The mesial portion 18 includes an open-oriented constant diameter mesial tip 22, having a selected constant diameter wire (in the embodiment it 1.0 mm (0.04 inches)), extending from a first tapered transition region 24. Mesial tip first leg 30 projects at an obtuse angle in relation to the central axis from the first tapered transition region 24 and second leg 32 projects orthogonally from the first leg 30 back toward the central axis, thereby defining an open right-angle bend to ensure proper alignment in the mesial half of the occlusal clearance.

The distal portion 20 includes a closed-oriented constant diameter distal tip 26, having a selected constant diameter wire (in the embodiment it 1.0 mm (0.04 inches)), extending from the second tapered transition region 28. Distal tip first leg 34 projects at an obtuse angle in relation to the central axis from tapered transition region 28 but parallel to the mesial tip first leg 30. Distal tip second leg 36 projects orthogonally from the distal tip first leg 34 and away from the central axis but parallel to the mesial tip second leg 32, thereby defining a closed right-angle bend to ensure proper alignment in the distal half of the occlusal clearance. The tapered regions 24 and 28 may extend approximately 30 mm (approximately 1.2 inches) from their respective connections to the respective mesial and distal wire tip first legs.

In the embodiment, the obtuse angle 38 is approximately 115 degrees, which provides good orientation for the user to insert comfortably into the rear teeth of a patient and adequate visibility for the user. In the embodiment, each of the respective mesial and distal wire tip first legs are not more than 10 mm (0.4 inches). In the embodiment, each of the respective mesial and distal wire tip second legs are not more than 5 mm (0.2 inches). In the embodiment, the mesial and distal constant diameter tips are circular in cross section to ensure precise measurement and patient comfort, but could be elliptical as well, or some variation of those. In the embodiment, the apparatus is fabricated from an autoclave-friendly material, to facilitate sterilization.

Figure 2:
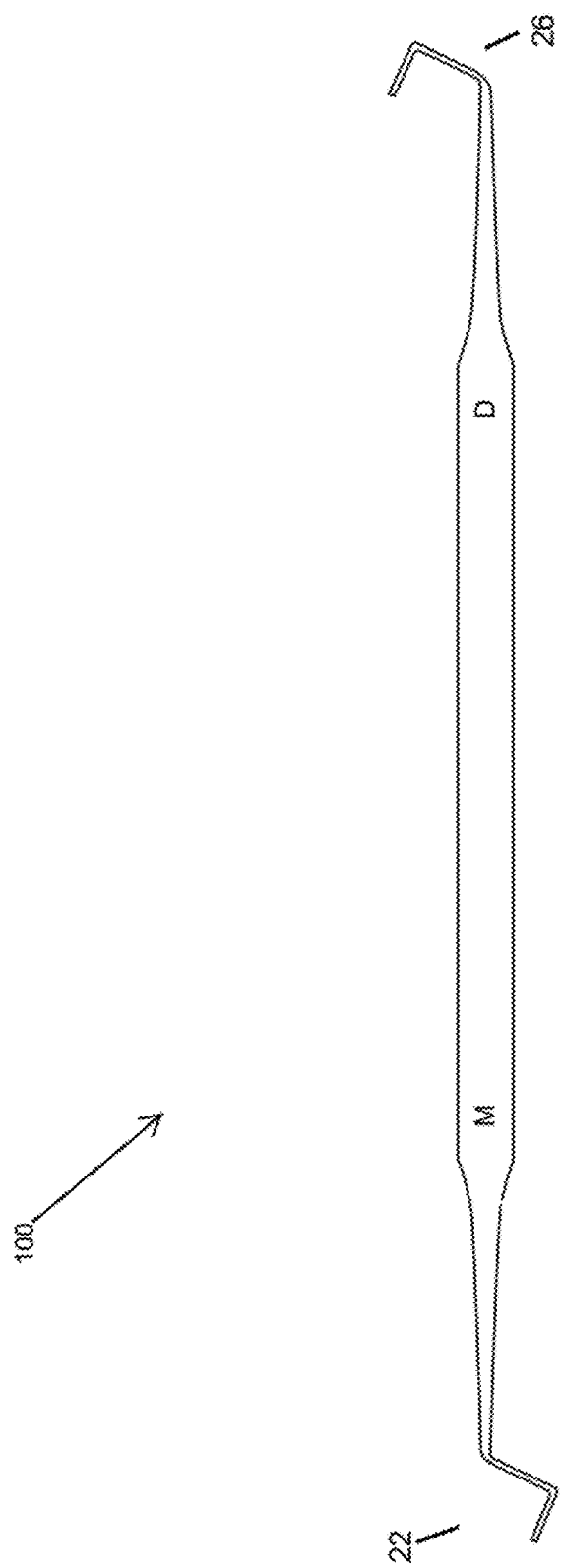
FIG. 2 shows a second embodiment of a 1.5 mm clearance tool.

Referring to FIG. 2, a second embodiment 100 is shown, similar to the first embodiment, and having a selected diameter of 1.5 mm for the mesial tip 22 and distal tip 26.

Figure 3:
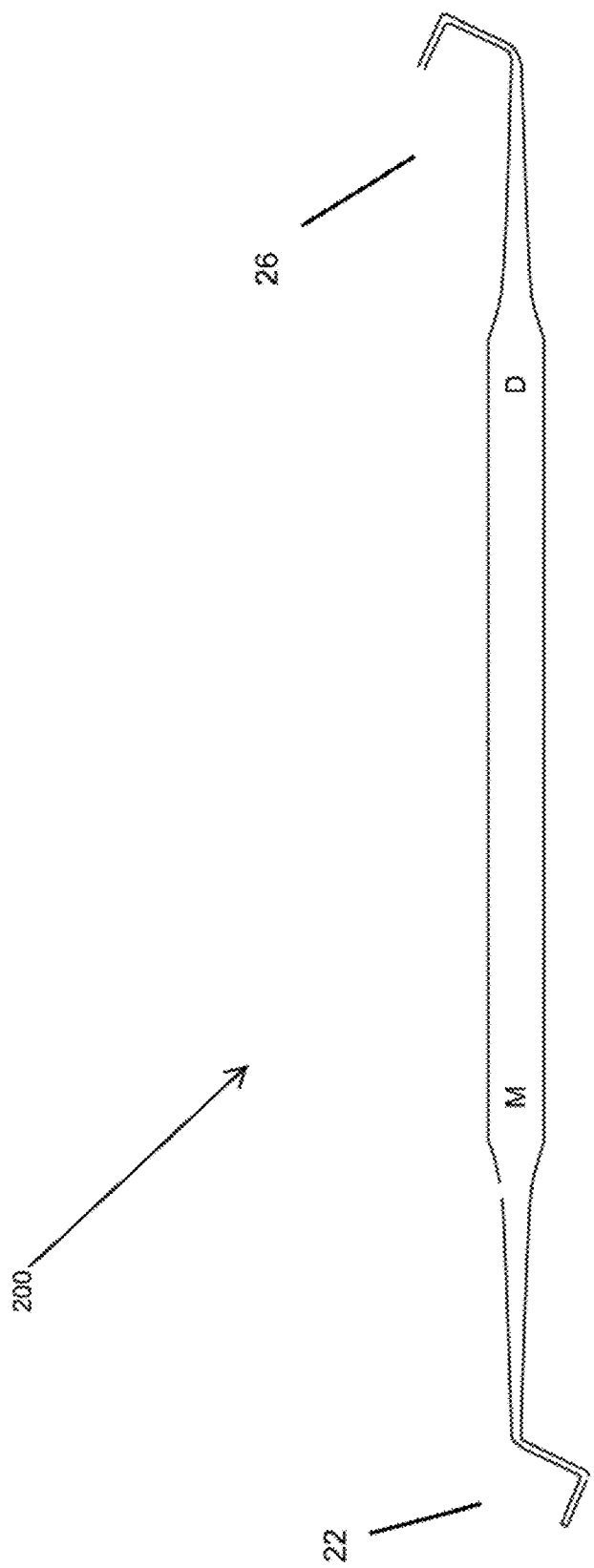
FIG. 3 shows a third embodiment of a 2.0 mm clearance tool.

Referring to FIG. 3, a third embodiment 200 is shown, similar to the first embodiment, and having a selected diameter of 2.0 mm for the mesial tip 22 and distal tip 26.

Figure 4:
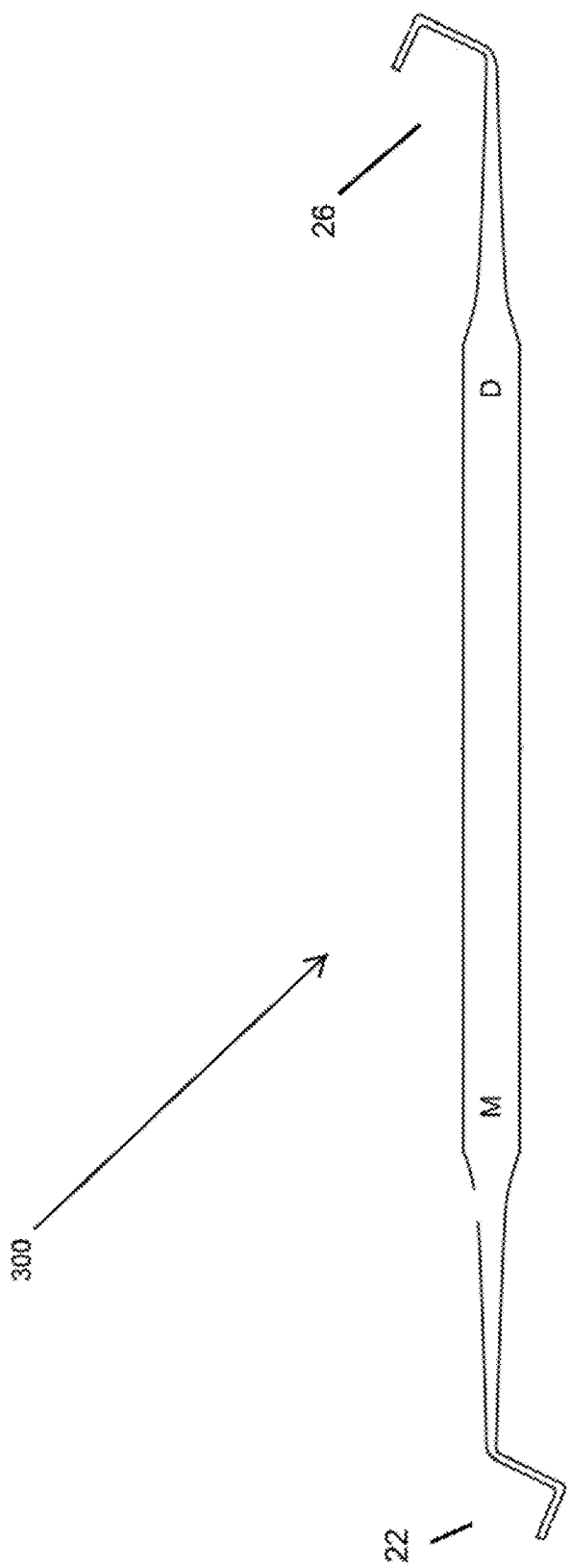
FIG. 4 shows a fourth embodiment of a 2.5 mm clearance tool.

Referring to FIG. 4, a fourth embodiment 300 is shown, similar to the first embodiment, and having a selected diameter of 2.5 mm for the mesial tip 22 and distal tip 26.

Figure 5:
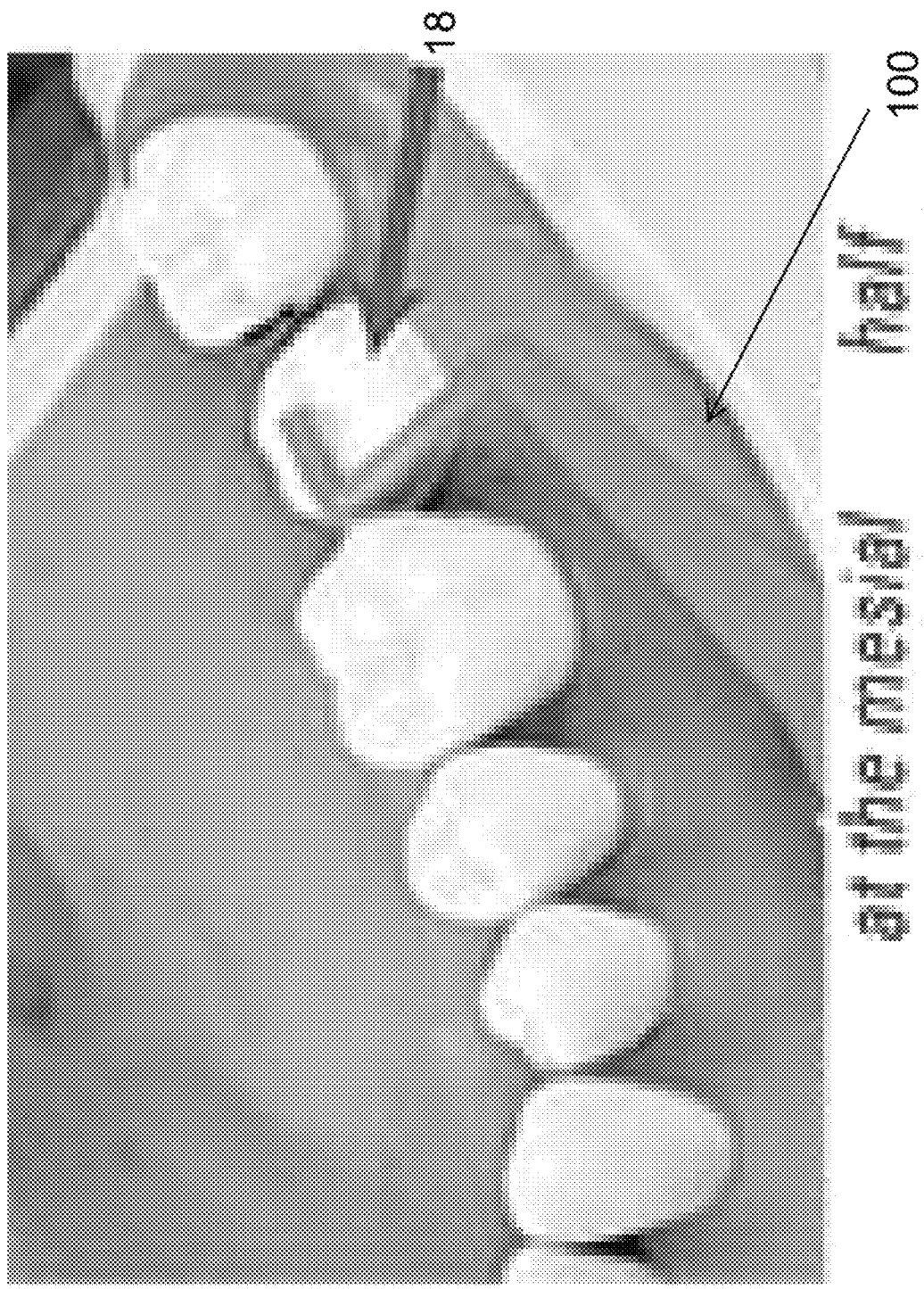
FIG. 5 shows a first embodiment mesial tip in use.
Figure 6:
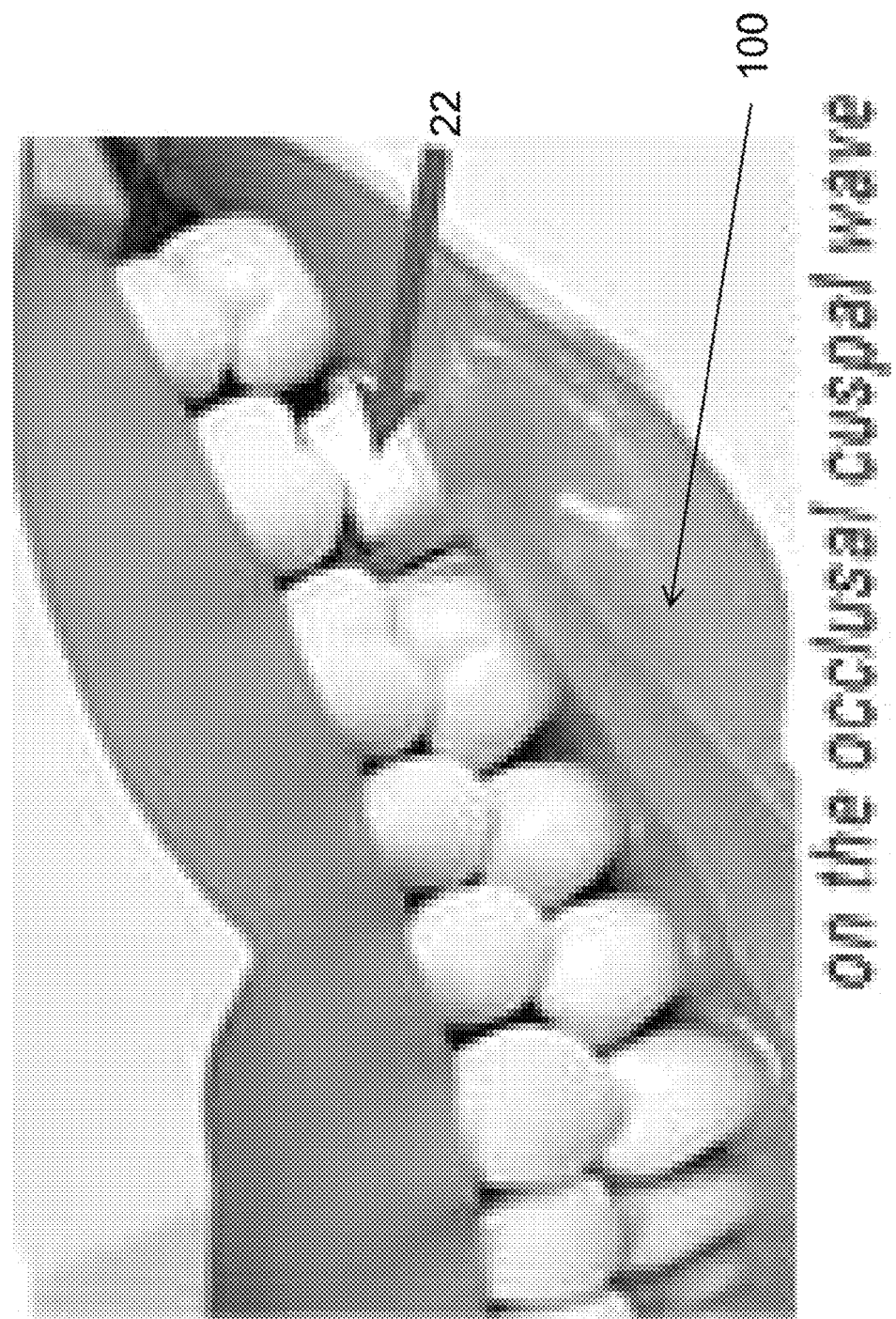
FIG. 6 shows a first embodiment mesial tip in use.
Figure 7:
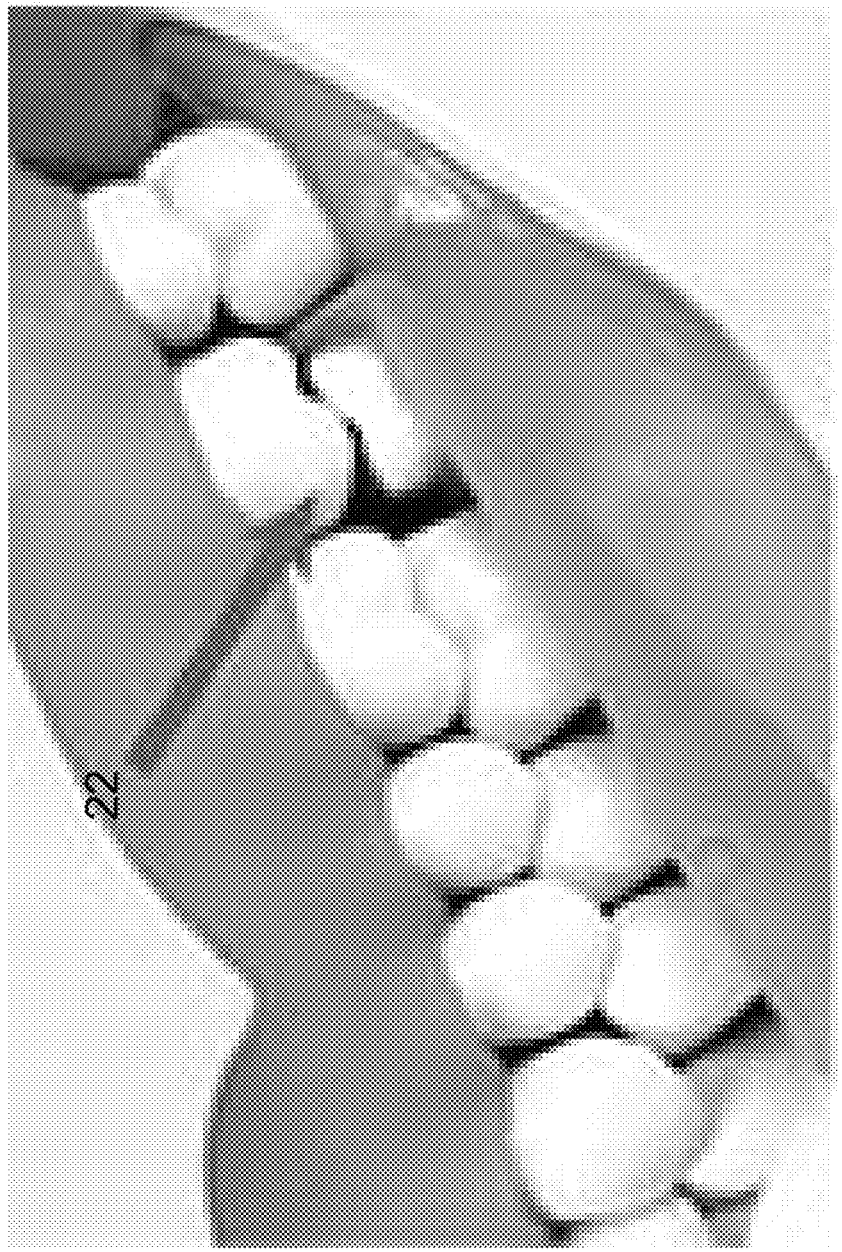
FIG. 7 shows a first embodiment distal tip in use.

Referring to FIGS. 5-7, an embodiment is shown in use. FIG. 5 shows the mesial tip 22 placed in the middle of the occlusal surface, and checks the occlusal clearance of the mesial half of the abutment reduction for a crown. FIG. 6 shows, with the teeth closed, the mesial tip 22 is passed freely through the mesial half of the occlusal clearance of the prepared abutment along the cuspal wave surface. This confirms the presence of adequate clearance. FIG. 7 shows the process repeated at the distal half with the distal tip 26 inserted into the distal half of the occlusal clearance of the prepared abutment, completing the confirmation of the clearance of the distal half of the abutment. Having verified the clearances with assurance, the dental surgeon can then take a traditional or digital impression for the crown to be fabricated.

Those skilled in the art will recognize that numerous modifications and changes may be made to the preferred embodiment without departing from the scope of the claimed invention. It will, of course, be understood that modifications of the invention, in its various aspects, will be apparent to those skilled in the art, some being apparent only after study, others being matters of routine mechanical, chemical and electronic design. No single feature, function or property of the preferred embodiment is essential. Other embodiments are possible, their specific designs depending upon the particular application.

I claim:

1. A dental apparatus for verifying clearances between teeth, comprising a center gripping portion, a mesial portion, and a distal portion, the center gripping portion extending from a first end to a second end and defining central axis, the mesial portion extending from the center gripping portion first end, the mesial portion having an open orientation and consisting of:
  a first tapered region coupled to the center gripping portion first end and extending therefrom, and
  a constant-diameter mesial wire tip of a selected diameter extending from the first tapered region, the mesial wire tip further comprising a mesial wire tip first leg coupled to the first tapered region and extending away from the central axis at a mesial wire tip first obtuse angle, and a mesial wire tip second leg extending orthogonally from the mesial wire tip first leg and oriented toward the central axis of the central gripping portion, thereby forming said open orientation; and the distal portion extending from the center gripping portion second end, the distal portion having a closed orientation and consisting of:
  a second tapered region coupled to the center gripping portion second end and extending therefrom, and
  a constant-diameter distal wire tip of the selected diameter extending from the second tapered region, the distal wire tip further comprising a distal wire tip first leg coupled to the second tapered region and extending away from the central axis at a distal wire tip second obtuse angle and parallel to the mesial wire tip first leg, and a distal wire tip second leg extending orthogonally from the distal wire tip first leg and oriented away from the central gripping portion central axis and parallel to the mesial tip second leg, thereby forming said closed orientation.

2. The dental apparatus of claim 1, further comprising:
wherein the selected wire diameters of the respective mesial wire tip and distal wire tips are selected from the range of 1.0 mm to 2.5 mm.

3. The dental apparatus of claim 1, further comprising:
wherein the selected wire diameters of the respective mesial wire tip and distal wire tips are selected from the group of: 1.0 mm, 1.5 mm, 2.0 mm, and 2.5 mm.

4. The dental apparatus of claim 1, further comprising:
wherein each of the first and second tapered regions taper from a respective first diameter proximate their respective connections to the center gripping portion first and second ends to a second diameter equal to the selected wire diameter.

5. The dental apparatus of claim 4, further comprising
wherein each of the first and second tapered regions extend 30 mm from their respective connections to the respective mesial and distal wire tip first legs.

6. The dental apparatus of claim 1, further comprising:
wherein each of the mesial wire tip and distal wire tip first legs is not more than 10 mm long, and each of the mesial wire tip and distal wire tip second legs is not more than 5 mm long.

7. The dental apparatus of claim 1, further comprising:
wherein each of the first and second obtuse angles are 115 degrees.

* * * * *